United States Patent [19]

Saunders

[11] 3,820,159

[45] June 25, 1974

[54] FINE TUNING AND RESET MECHANISM FOR TAPE PLAYERS AND THE LIKE

[75] Inventor: Allan L. Saunders, Melrose, Mass.

[73] Assignee: Automatic Radio Mfg. Co., Inc., Melrose, Mass.

[22] Filed: Nov. 8, 1972

[21] Appl. No.: 304,742

[52] U.S. Cl. .......................................... 360/106
[51] Int. Cl. ......................... G11b 5/56, G11b 21/08
[58] Field of Search ......... 179/100.2 CA; 274/11 A, 274/4 A

[56] References Cited

UNITED STATES PATENTS 3,558,141 1/1971 Suzuki ............................... 274/4 A
3,672,685 6/1972 Tolar ......................... 179/100.2 CA
3,684,840 8/1972 Ban .......................... 179/100.2 CA
3,730,532 5/1973 Miyamoto .......................... 274/4 A

*Primary Examiner*—Harry N. Haroian
*Assistant Examiner*—John W. Shepperd
*Attorney, Agent, or Firm*—Chittick, Thompson & Pfund

[57] ABSTRACT

In a cartridge-type tape player, an adjustment mechanism for manually fine-tuning the transducer head by means of a control which is accessible from the exterior of the tape player. The adjustment mechanism has associated therewith a reset mechanism which automatically cancels the fine-tuning adjustments previously made to the transducer head when the tape cartridge is removed from the player.

9 Claims, 6 Drawing Figures

FINE TUNING AND RESET MECHANISM FOR TAPE PLAYERS AND THE LIKE

DESCRIPTION OF THE INVENTION

This invention relates generally to tape players and the like wherein a magnetic tape is moved across a transducer head, and more particularly to an improved fine tuning arrangement for the transducer head.

The conventional tape player is provided with a guideway or tunnel which is adapted to receive a tape cartridge in axial insertion therein. During operation of the player, the cartridge is held in the "play" position with the magnetic tape in contact with and moving across a transducer head which is appropriately positioned and supported at a location adjacent to the interior end of the guideway or tunnel.

The position of the transducer head relative to the path of tape travel is initially preset by the manufacturer under carefully controlled test conditions so as to produce optimum results. Proper positioning of the transducer head is critical, particularly in multi-track tape players where the transducer head is indexed across the tape from one set of tracks to another. If the transducer head is not properly adjusted to a particular tape, the result will be "cross-talk" between the different tracks.

If the factory setting has been accomplished accurately, as is usually the case with high quality tape players, and if the tapes subsequently played are relatively new, cross-talk will normally not be a problem. However, if a worn tape is employed, cross-talk may be experienced even if the factory setting is proper. To take care of this situation, it has already been proposed to provide a manual fine-tuning adjustment which will enable a user to adjust the player to a worn tape. One such arrangement is described in U.S. Pat. No. 3,558,141. However, the problem with this and other like prior art arrangements is that the manual fine-tuning adjustment destroys the original factory setting and thus necessitates a subsequent manual resetting by the user when the next cartridge is inserted in the player. Since the manual fine-tuning adjustment made by the user is rarely if ever as precise as that originally accomplished at the factory, the subsequent performance of the player is often permanently impaired.

The present invention offers a solution to this problem, and has as its prime objective the provision of a novel and improved fine-tuning adjustment mechanism which has associated therewith a reset mechanism for automatically returning the transducer head to its original factory preset condition when a tape cartridge is removed from the player.

This and other objects and advantages of the present invention will become more apparent as the description proceeds with the aid of the accompanying drawings wherein.

Figure 2:
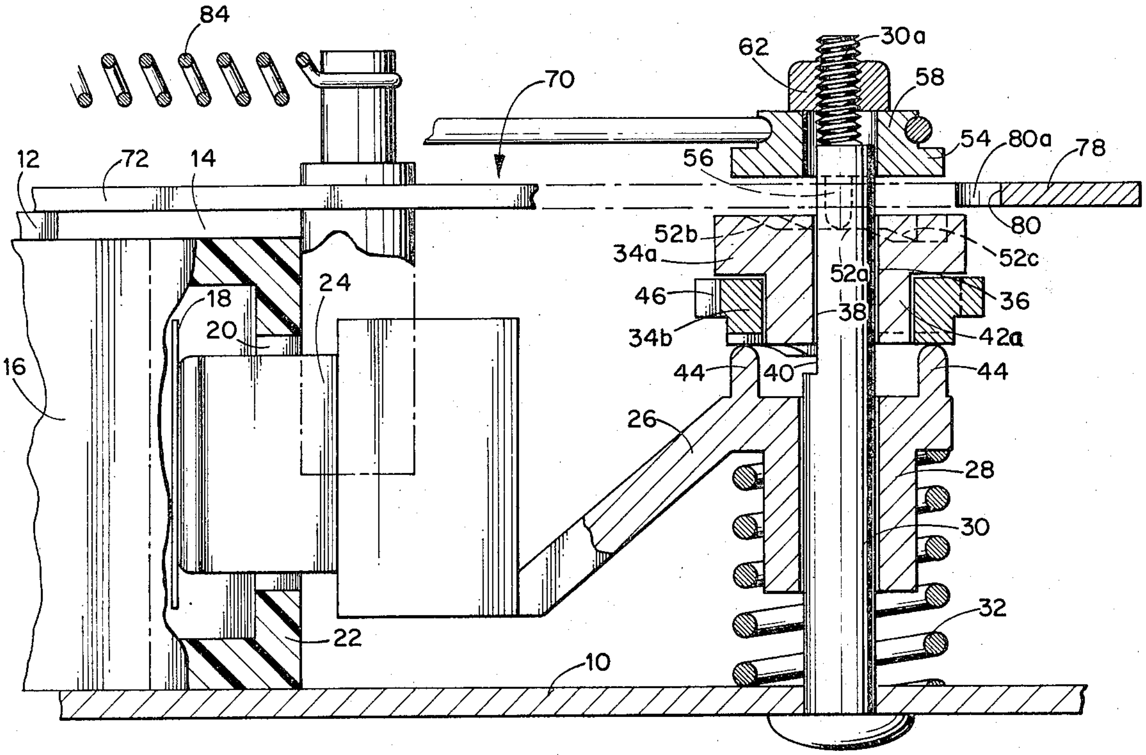
FIG. 2 is a sectional view on an enlarged scale taken along lines 2—2 of FIG. 1.

Referring now to the drawings wherein like reference numerals designate like parts throughout the several views, the base plate of the tape player is shown at 10. The base plate cooperates with an upper plate 12 and side plates (not shown) to define a tunnel or guideway 14 which is suitably dimensioned to receive a tape cartridge 16 in axial insertion therein. The tape cartridge 16 contains an endless magnetic tape 18 which is accessible from the front of the cartridge through an opening 20 in the front cartridge wall 22. The opening 20 accommodates the tape player's transducer head 24 which presses against the tape (as shown in FIG. 2) when the cartridge is in the "play" position. The design of the cartridge, the manner of driving the magnetic tape and of holding the cartridge in the play position are conventional features which are well known to those skilled in the art and hence these features will not be described herein.

The transducer head 24 is mounted on one end of a bracket 26, the other end of which is provided with a hub 28 which is mounted on slidably movable along the length of an upstanding support member 30. The support member 30 is fixed relative to the base plate 10 and is generally cylindrical with a threaded upper end **30*a*. A coiled spring 32 surrounds the support member 30 at a position between the base plate 10 and the bracket 26.**

Figure 3:
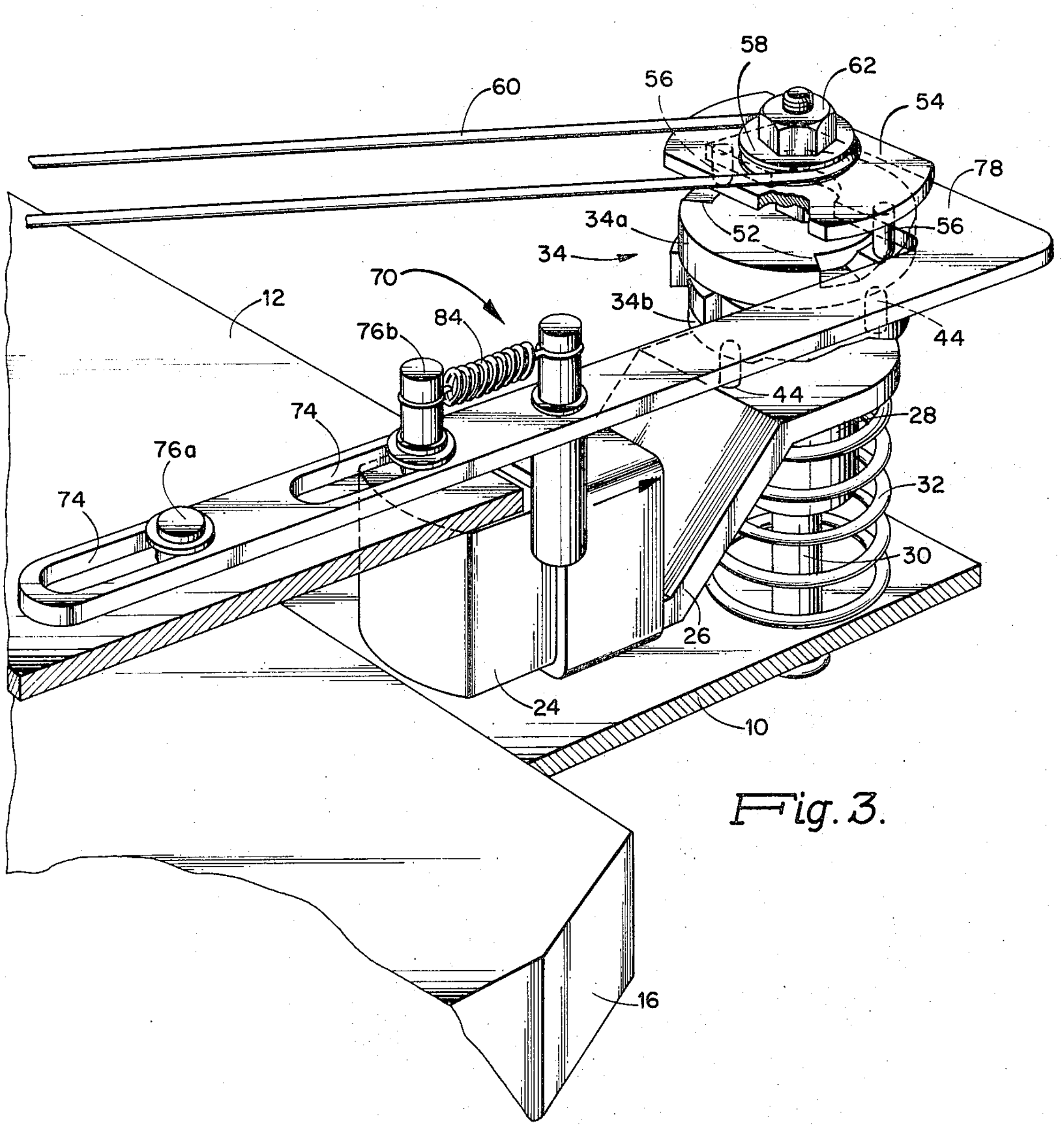
FIG. 3 is a view in perspective of the fine-tuning and reset mechanism shown in FIGS. 1 and 2.
Figure 4:
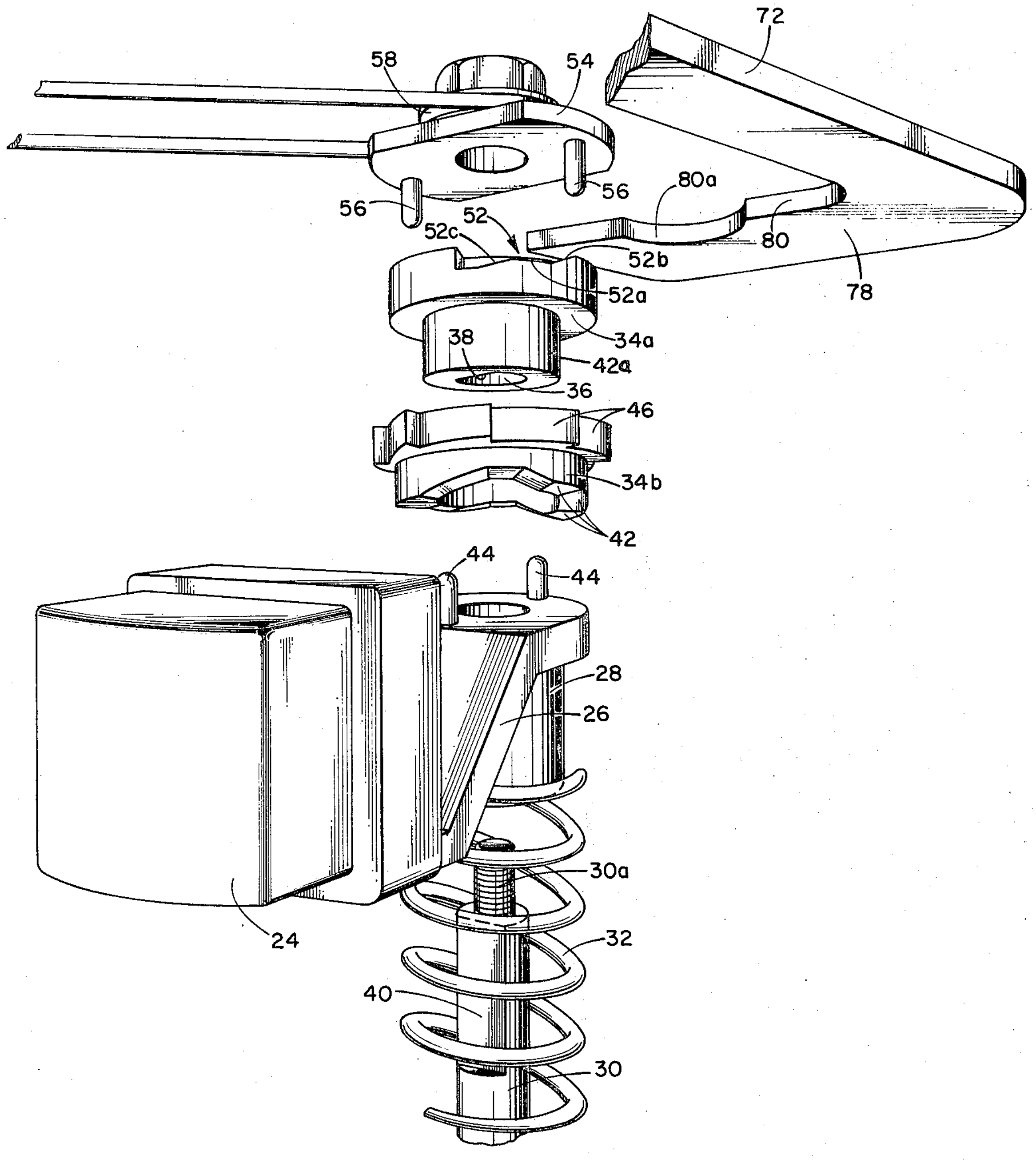
FIG. 4 is an exploded perspective view of the adjustment means.

An intermediate means or assembly which is generally indicated at 34 in FIGS. 2 and 3 and which is made up of a non-rotatable collar **34*a* surrounded by a rotatable sleeve 34*b*, is slidably mounted on the support member 30 above the bracket 26. The collar 34*a* is provided with a central opening 36 which is defined in part by a flat face 38. The flat face 38 cooperates in non-rotatable engagement with a corresponding flat face 40 extending along an intermediate section of the support member 30. Collar 34*a* has a reduced diameter portion 42*a* which is surrounded by the rotatable sleeve 34*b*. As is best shown in FIG. 4, the underside of sleeve 34*b* defines a plurality of cam surfaces indicated typically at 42, which surfaces are engaged by a pair of followers 44 on the bracket 26 when the components are assembled on the support member 30. The sleeve 34*b* is further provided with laterally extending ratchet teeth indicated typically at 46. The ratchet teeth 46 are engageable by an indexing mechanism (not shown) which operates in a known manner to intermittently rotate sleeve 34*b*, thereby operating through the cam surfaces 42 and the followers 44 to vertically shift the bracket 26 and transducer head 24 predetermined distances when shifting from one track to another on the magnetic tape 18.**

The non-rotatable collar **34*a* is provided on its upper surface with oppositely disposed sets of cam surfaces generally indicated at 52. As is best shown in FIG. 2, each set of cam surfaces 52 includes a "neutral" intermediate surface 52*a* in a plane perpendicular to the longitudinal axis of the support member 30, and two oppositely inclined surfaces 52*b* and 52*c*.**

An actuating member 54 is rotatably mounted on the support member 30 at a position above the non-rotatable collar **34*a*. The actuating member 54 is provided with a pair of downwardly extending followers 56 which engage the oppositely disposed sets of cam surfaces 52. The actuator 54 is further integrally provided with a pulley 58 which accommodates an endless belt, tape, rope or other like member 60 to permit rotation of the actuator 54** from control knob (not shown) which is accessible from a location exterior of the tape player.

An adjustment nut 62 is threaded onto the upper end of the support member 30 and exerts a downward force on the underlying components, which downward force opposes the upward force exerted by the spring 32.

The above described arrangement permits three separate adjustments to be imparted to the transducer head 24 in a direction which is parallel to the longitudinal axis of the support member 30 and transverse to the direction of tape travel across the transducer head. These adjustments are as follows: first, a factory fine-tuning adjustment can be made under controlled test conditions by turning the adjustment nut 62 in either a clockwise or counterclockwise direction. Since the nut 62 is subsequently enclosed by the housing of the tape player and thus not readily accessible to the user, this factory adjustment thereafter remains undisturbed. A second series of predetermined adjustments of fixed magnitude are sequentially accomplished through the combined action of the rotatable sleeve **34*b* with its cam surfaces 42 and the followers 44 on the bracket 26. This second set of adjustments shifts and transducer head from one track to another on the tape. A third fine-tuning adjustment, which is separate from the first and second adjustments just previously mentioned, is accomplished through the cooperative action of the rotatable actuator 54 and its depending followers 56, and the cam surfaces 52 on the non-rotatable collar 34*a* of the intermediate means or assembly 34.** This fine-tuning adjustment is available to a user of the tape player if for example the tape being played is badly worn and the transducer head is not properly positioned, thereby producing cross-talk.

A reset mechanism, which is generally indicated by the reference numeral 70, is employed in conjunction with the fine tuning mechanism last mentioned above. The reset mechanism includes a generally L-shaped operating member 72 having one leg suitably sloted as at 74 to accommodate retaining pins **76*a* and 76*b* which extend vertically from the top plate 12. The operating member 72 is thus slidable towards and away from the support member 30 in a direction which is parallel to the direction of movement of the tape cartridge 16 when the latter is inserted into and withdrawn from the tape player. The extent of movement of the operating member 72 is limited by the lengths of the slots 74. The operating member includes a laterally extending leg 78, the inside edge 80 of which has a semi-circular depression 80*a*.**

Figure 1:
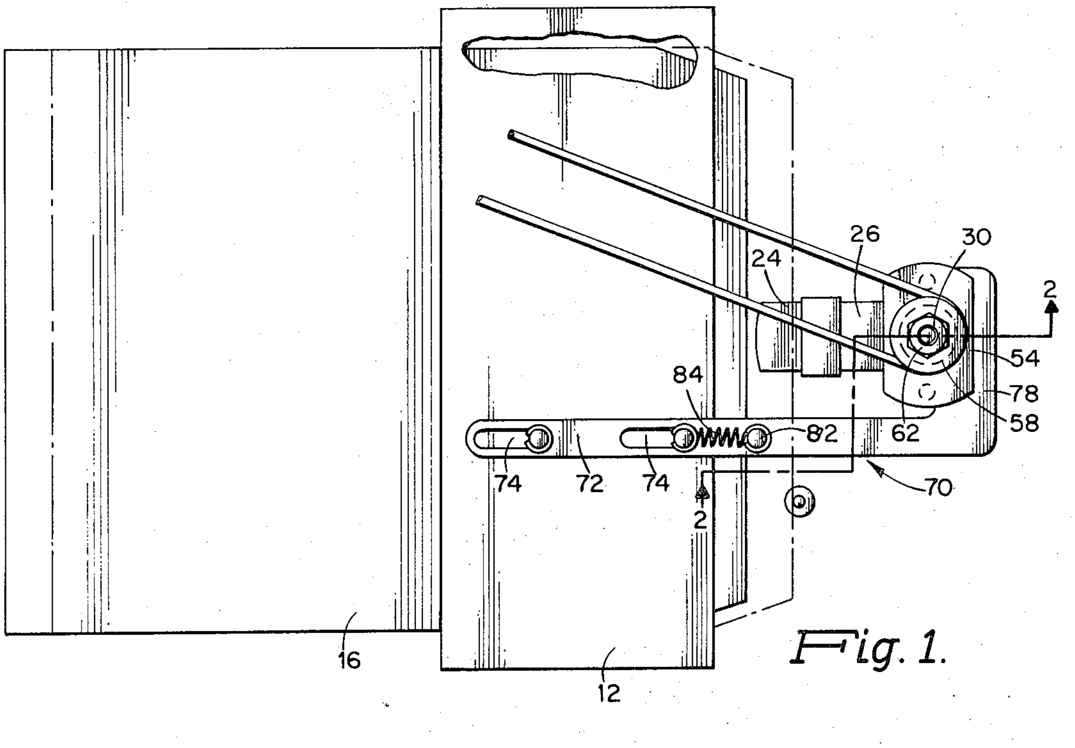
FIG. 1 is a plan view of a fine-tuning and reset mechanism embodying the concepts of the present invention.
Figure 5:
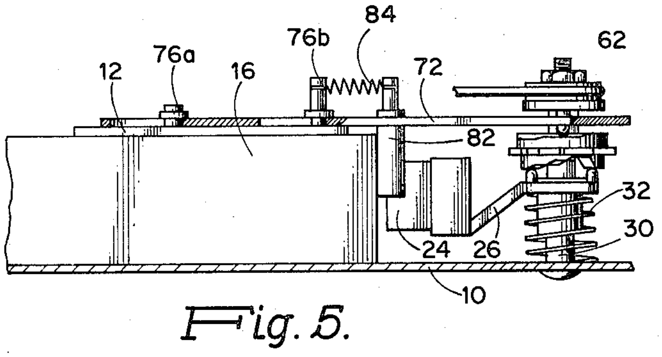
FIGS. 5 and 6 are schematic illustrations on a reduced scale showing the reset mechanism in its operative and inoperative positions respectively.

A pin 82 extends vertically through the operating member 72. The lower section of the pin depends downwardly from the operating member into the cartridge tunnel or guideway 14, and the upper end of the pin has connected thereto one end of a spring 84, the other end of the spring being connected to the retaining pin **76*b* which protrudes vertically from the top plate 12. When a cartridge 16 is removed from the player, the spring 84 resiliently urges the operating member 72 to an operative "cancel" position as shown in FIGS. 1, 3 and 5. When in this position, the inside edge 80 of the leg 78 on the operating member 72 engages the depending followers 56 on the rotatable actuator 54 and rotates these followers to a neutral position in contact with the intermediate horizontal cam surfaces 52*a* on the non-rotatable collar 34*a* of the intermediate means 34. The semi-circular depression 80*a* accommodates the support member 30.**

Figure 6:
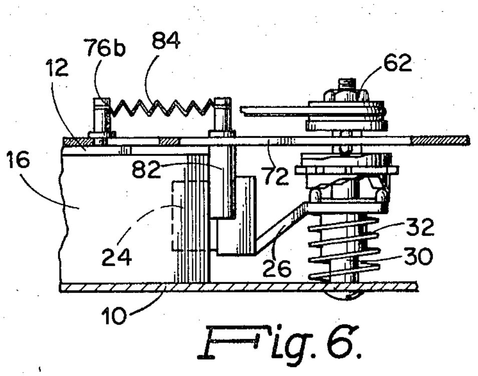

When a cartridge 16 is inserted into the tape player, the front cartridge wall 22 engages the depending portion of the pin 82 on the operating member 72 and pushes the operating member to the inoperative position shown in FIGS. 2 and 6. When thus positioned, the inside edge 80 of the leg 78 is moved away from the followers 56, thereby freeing the actuator member 54 for rotation about the vertical axis of the support member 30. Thus, fine adjustments can be imparted to the transducer head 24 by rotating the actuator 54 by a remote control (not shown) which operates through the endless belt 60. If the followers 56 engage the cam surfaces **52*b*, the transducer head is adjusted downwardly. Similarly, if the followers 56 engage the cam surfaces 52*c*, the transducer head is adjusted upwardly under the influence of the spring member 32. The fine tuning adjustments thus imparted to the transducer head will remain in effect as long as the tape cartridge 16 is in place. However, when the tape cartridge is removed, the spring 84 will urge the operating member 72 back into its operative cancel position which as previously mentioned will cause the inside edge 80 of the leg 78 to contact the followers 56, thereby readjusting the actuator 54 to the neutral position with the followers 56 engaging the neutral cam surfaces 52*a*.**

In light of the above, it will now be appreciated by those skilled in the art that the present invention enables fine tuning adjustments to be imparted to the transducer head 24 independently of the factory fine-tuning adjustments which are imparted to the transducer head through rotation of the adjustment nut 62. The fine tuning adjustments of the present invention are automatically cancelled each time a cartridge is removed from the tape player. Hence, the tape player is always in its factory-set condition prior to the insertion of a tape cartridge into the tunnel or guideway 14.

It is my intention to cover all changes and modifications of the embodiments herein chosen for purposes of disclosure which do not depart from the spirit and scope of the invention.

I claim:

1. In a cartridge-type tape player having means for receiving a tape cartridge in insertion therein and a transducer head over which a magnetic tape in the cartridge is moved during operation of the player, the improvement comprising: adjustment means for moving the transducer head from one position to another in a direction transverse to the direction of tape travel, and reset means responsive to movement of the tape cartridge relative to the transducer head for cancelling any adjustment made to the position of the transducer head by said adjustment means.

2. The apparatus as claimed in claim 1 wherein insertion of a tape cartridge into the tape player to a playing position at which the magnetic tape is in contact with the transducer head renders said reset means inoperative, thereby permitting said adjustment means to be employed to move the transducer head from one position to another in a direction transverse to the direction of tape travel, and wherein removal of the cartridge from the tape player is accompanied by actuation of said reset means, which actuation cancels any adjustment previously made to the transducer head through said adjustment means.

3. The apparatus as claimed in claim 1 further characterized by a fixed support member which extends longitudinally in a direction transverse to the direction of tape travel, and wherein the transducer head is mounted on a bracket which is carried on said support member for movement along the length thereof.

4. The apparatus as claimed in claim 3 wherein said adjustment means is comprised of an actuator member rotatably mounted on said support member, follower means on said actuator member, intermediate means positioned on and movable along the length of said support member, said intermediate means being positioned between said bracket and said actuator member, said intermediate means having cam means in engagement with said follower means, whereby rotation of said actuator means and the accompanying rotation of said follower means relative to said cam means will impart movement of said bracket along the length of said support member.

5. The apparatus as claimed in claim 4 further characterized by resilient means for urging said bracket member and said intermediate means towards said actuator member.

6. The apparatus as claimed in claim 5 wherein said cam means includes a neutral surface in a plane perpendicular to the longitudinal axis of said support member, operating surfaces on either side of said neutral surface, said operating surfaces being in oppositely inclined planes relative to the longitudinal axis of said support member, whereby said adjustment means will be in a "neutral" position when said follower means is in contact with said neutral surface, and whereby movement of said follower means across one or the other of said oppositely inclined operating surfaces will impart movement of said intermediate means and said bracket in opposite directions along said support member.

7. The apparatus as claimed in claim 6 wherein said reset means is comprised of an operating member movable relative to said support member in a direction parallel to the direction of movement of a tape cartridge relative to said support member, means for resiliently urging said operating member into a "reset" position at which the operating member is in contact with and holding said follower means in the "neutral" position, and laterally extending means on said operating member engageable by a cartridge, whereupon insertion of a cartridge into the tape player will cause said operating member to move out of said "reset" position to an inoperative position out of engagement with said follower means.

8. The apparatus as claimed in claim 7 further characterized by means permitting said actuator member to be remotely rotated from a location exterior of the tape player.

9. In an apparatus adapted to slidably receive a tape cartridge containing a magnetic tape, and having a transducer head in contact with the tape during operation of the apparatus, the improvement comprising: adjustment means for adjusting the position of the transducer head, and means associated with said adjustment means and operatively responsive to removal of the tape cartridge from the apparatus for cancelling the adjustments previously made to the transducer head by said adjustment means.

* * * * *